United States Patent
Brand et al.

(10) Patent No.: US 12,483,888 B2
(45) Date of Patent: Nov. 25, 2025

(54) SYSTEM AND METHOD FOR ESTABLISHING END-TO-END SECURE COMMUNICATION USING PER-SESSION VALIDATION

(71) Applicant: Verizon Patent and Licensing Inc., Basking Ridge, NJ (US)

(72) Inventors: Paul Brand, Coppell, TX (US); Antonio M. Osorio, Jersey City, NJ (US); Mansoor Ali Shah Mohammed, Plano, TX (US); Sean William Hull, Raleigh, NC (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 576 days.

(21) Appl. No.: 17/829,414

(22) Filed: Jun. 1, 2022

(65) Prior Publication Data
US 2023/0397006 A1 Dec. 7, 2023

(51) Int. Cl.
*H04W 12/062* (2021.01)
*H04W 12/0431* (2021.01)
*H04W 12/069* (2021.01)
*H04W 12/086* (2021.01)
*H04W 12/71* (2021.01)
*H04W 12/72* (2021.01)

(52) U.S. Cl.
CPC ..... *H04W 12/069* (2021.01); *H04W 12/0431* (2021.01); *H04W 12/086* (2021.01); *H04W 12/71* (2021.01); *H04W 12/72* (2021.01)

(58) Field of Classification Search
None
See application file for complete search history.

(56) References Cited

U.S. PATENT DOCUMENTS

| | | | |
|---|---|---|---|
| 2013/0067552 A1* | 3/2013 | Hawkes | H04W 12/08 726/7 |
| 2022/0210636 A1* | 6/2022 | Gupta | H04W 8/12 |
| 2023/0111913 A1* | 4/2023 | Hans | H04W 36/0066 370/331 |
| 2023/0379700 A1* | 11/2023 | Zhu | H04W 12/037 |
| 2024/0137765 A1* | 4/2024 | Jost | H04W 12/069 |
| 2024/0187856 A1* | 6/2024 | Atarius | H04W 12/069 |

* cited by examiner

*Primary Examiner* — Nelson S. Giddins

(57) ABSTRACT

A method, a network device, and a non-transitory computer-readable storage medium are described in relation to an per-session validation with secure connection and authentication service. The service may include the installation of a client after an end device completes a primary authentication and registration procedure with a core network. The client and an enforcement device may establish a secure and encrypted session via which packet data unit (PDU) session requests may be approved or denied based on network access polices associated with the end device. An enforcement orchestration service may configure enforcement devices and obtain encryption keys from the core network for use by the enforcement device.

20 Claims, 11 Drawing Sheets

SYSTEM AND METHOD FOR ESTABLISHING END-TO-END SECURE COMMUNICATION USING PER-SESSION VALIDATION

BACKGROUND

Development and design of networks present certain challenges from a network-side perspective and an end device perspective. For example, Next Generation (NG) wireless networks, such as Fifth Generation New Radio (5G NR) networks are being deployed and under development.

DETAILED DESCRIPTION

Figure 1:
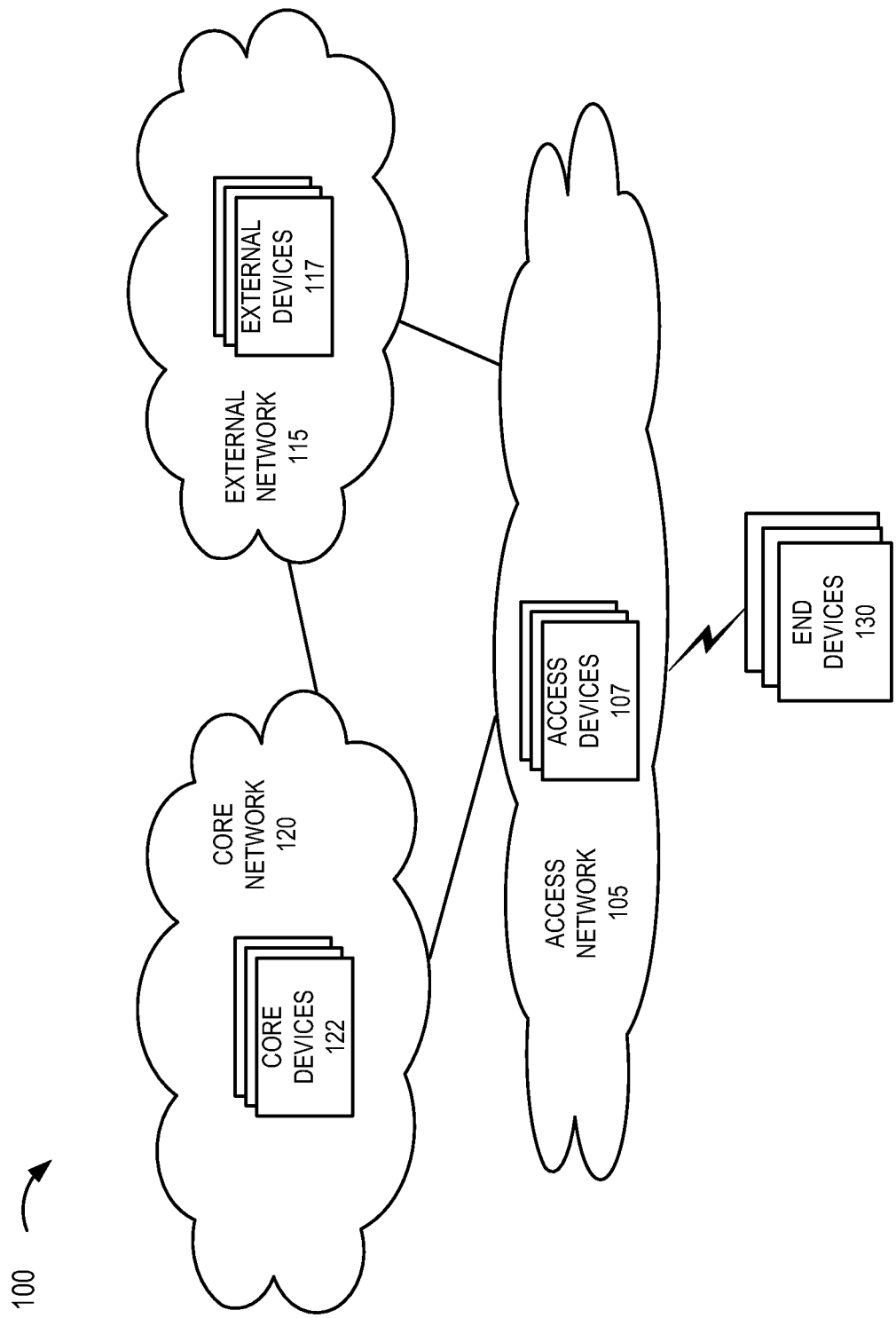
FIG. 1 is a diagram illustrating an exemplary environment in which an exemplary embodiment of a per-session validation with secure connection and authentication service may be implemented.

The following detailed description refers to the accompanying drawings. The same reference numbers in different drawings may identify the same or similar elements. Also, the following detailed description does not limit the invention.

Typically, for Fourth Generation (4G) and Fifth Generation (5G) network access for example, an end device may perform an authentication procedure at a device level (e.g., instead at a user level). For example, an authentication procedure may be performed between the end device and a core network along with a registration in accordance with a standard associated with a standards body, such as Third Generation Partnership Project (3GPP), 3GPP2, International Telecommunication Union (ITU), European Telecommunications Standards Institute (ETSI), GSM Association (GSMA), and the like. After a successful authentication (and registration), a user of the end device and/or the end device has/have access to the network and potentially multiple types of applications and/or services (referred to as "application services") that may reside in an external network. The user and/or end device may establish various sessions and traffic may be unencrypted, which may be considered a privacy and/or security weakness, unless the application service includes encryption.

In an enterprise network, for example, network access may be subject to a zero trust procedure in which each application session is validated and monitored before allowing a connection, regardless of whether the application session is internally or externally sourced. For example, the end device may include a virtual private network (VPN) client or another type of client application (e.g., over-the-top (OTT) client, mobile application client, or the like) that facilitates the validation of each session. However, the end device that may host the VPN client may access an untrusted network, a public network (e.g., public Wi-Fi), or the like before the client may be launched or used. As such, the zero trust procedure may not offer any security measures under these circumstances because prior to launching the client, the end device/user may be afforded an "allow all" or unrestricted network access policy.

According to exemplary embodiments, a per-session validation with secure connection and authentication service is described. According to an exemplary embodiment, the per-session validation with secure connection and authentication service may include an enforcement orchestration device and an enforcement device. According to an exemplary embodiment, the enforcement orchestration device may distribute information obtained from a core network device (e.g., a network exposure function (NEF)), assign the enforcement device to an end device based on the information, maintain security policies, distribute the security policies to the enforcement device, and manage a connection between the end device and the enforcement device, among other things, as described herein.

According to an exemplary embodiment, the enforcement device may establish a secure communication (e.g., tunnel, network slice, or the like) with the end device, authenticate a user of the end device, validate each prospective session to be established via the secure communication based on user privileges, apply a security policy at a session level for each approved session, establish application service session with an application service device, inspect traffic, log session information, and proxy for the enforcement orchestration device, among other things, as described herein.

According to other exemplary embodiments, one or more functions, processes, and/or services of the enforcement orchestration device may be implemented by the enforcement device. Additionally, or alternatively, according to still other exemplary embodiments, one or more functions, processes, and/or services of the enforcement device may be implemented by the enforcement orchestration device.

According to an exemplary embodiment, the per-session validation with secure connection and authentication service may include a client configured on the end device. According to an exemplary embodiment, the client may be installed on the end device based on an over-the-air (OTA) procedure. The OTA procedure may be performed after the end device has successfully registered with a network, such as a core network. According to an exemplary embodiment, the end device may have successfully completed a primary authentication (e.g., at a device level) with the core network. According to an exemplary embodiment, the client may automatically establish a secure session with the enforcement orchestration device and provide an authentication and key management for applications (AKMA) Key identifier (A-KID). The client may obtain a network address of the enforcement device from the enforcement orchestration device.

According to an exemplary embodiment, the enforcement orchestration device may obtain key and location of end device information, and select and configure an enforcement device, as described herein. According to an exemplary embodiment, the client may establish a secure connection with the enforcement device and the enforcement device may validate each session via the secure connection, authenticate a user of the end device, among other processes, as described herein.

According to various exemplary embodiments, the per-session validation with secure connection and authentication service may use an AKMA service of a core network, an asymmetric key service, and/or a symmetric key service, as described herein.

In view of the foregoing, the per-session validation with secure connection and authentication service may validate each session between the client of the end device and an application service. For example, the client and the enforcement device may restrict and afford security to any and all network access to an application service by a user/end device. This is in contrast to the zero trust procedure in which a user/end device may not launch or use a VPN client, for example, and the user/end device may access an application service via an unsecure network. For example, the client may be configured to automatically launch and perform various communications and procedures associated with the per-session validation and secure connection and authentication service, as described herein. Additionally, the per-session validation with secure connection and authentication service may provide user authentication subsequent to successful registration and primary authentication with a core network having been completed. In this way, device level and user level authentication may be provided. Also, the per-session validation with secure connection and authentication service may provide encryption, inspection, and logging services of traffic/sessions, as described herein.

The per-session validation with secure connection and authentication service may implement the enforcement device close to the network edge, which may increase performance by reducing propagation delay and minimize routing of traffic. This is in contrast to zero trust architectures that may backhaul traffic to a central location that can negatively impact latency and add routing costs.

FIG. 1 is a diagram illustrating an exemplary environment 100 in which an exemplary embodiment of per-session validation with secure connection and authentication service may be implemented. As illustrated, environment 100 includes an access network 105, an external network 115, and a core network 120. Access network 105 includes access devices 107 (also referred to individually or generally as access device 107). External network 115 includes external devices 117 (also referred to individually or generally as external device 117). Core network 120 includes core devices 122 (also referred to individually or generally as core device 122). Environment 100 further includes end devices 130 (also referred to individually or generally as end device 130).

The number, type, and arrangement of networks illustrated in environment 100 are exemplary. For example, according to other exemplary embodiments, environment 100 may include fewer networks, additional networks, and/or different networks. For example, according to other exemplary embodiments, other networks not illustrated in FIG. 1 may be included, such as an X-haul network (e.g., backhaul, mid-haul, fronthaul, etc.), a transport network (e.g., Signaling System No. 7 (SS7), etc.), or another type of network that may support a wireless service and/or an application service, as described herein.

A network device, a network element, or a network function (referred to herein simply as a network device) may be implemented according to one or multiple network architectures, such as a client device, a server device, a peer device, a proxy device, a cloud device, and/or a virtualized network device. Additionally, a network device may be implemented according to various computing architectures, such as centralized, distributed, cloud (e.g., elastic, public, private, etc.), edge, fog, and/or another type of computing architecture, and may be incorporated into distinct types of network architectures (e.g., Software Defined Networking (SDN), virtual, logical, network slice, etc.). The number, the type, and the arrangement of network devices are exemplary.

Environment 100 includes communication links between the networks and between the network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication. A message communicated in support of the per-session validation with secure connection and authentication service may use at least one of these planes of communication. According to various exemplary implementations, the interface of the network device may be a service-based interface, a reference point-based interface, an Open Radio Access Network (O-RAN) interface, a 5G interface, another generation of interface (e.g., 5.5G, Sixth Generation (6G), Seventh Generation (7G), etc.), or some other type of network interface (e.g., a 4G interface or other legacy interface).

Access network 105 may include one or multiple networks of one or multiple types and technologies. For example, access network 105 may be implemented to include a Fifth Generation (5G) RAN, a future generation RAN (e.g., a 6G RAN, a 7G RAN, or a subsequent generation RAN), a centralized-RAN (C-RAN), an O-RAN, and/or another type of access network. Access network 105 may include a legacy RAN (e.g., a Third Generation (3G) RAN, a Fourth Generation (4G) or 4.5 RAN, etc.). Access network 105 may communicate with and/or include other types of access networks, such as, for example, a Wi-Fi network, a Worldwide Interoperability for Microwave Access (WiMAX) network, a local area network (LAN), a Citizens Broadband Radio System (CBRS) network, a cloud RAN, an O-RAN network, a virtualized RAN (vRAN), a self-organizing network (SON), a wired network (e.g., optical, cable, etc.), or another type of network that provides access to or can be used as an on-ramp to access network 105.

Depending on the implementation, access network 105 may include one or multiple types of network devices, such as access devices 107. For example, access device 107 may include a next generation Node B (gNB), an evolved LTE (eLTE) evolved Node B (eNB), an eNB, a radio network controller (RNC), a remote radio head (RRH), a baseband unit (BBU), a radio unit (RU), a remote radio unit (RRU), a centralized unit (CU), a CU-control plane (CP), a CU-user plane (UP), a distributed unit (DU), a small cell node (e.g., a picocell device, a femtocell device, a microcell device, a home eNB, etc.), an open network device (e.g., O-RAN Centralized Unit (O-CU), O-RAN Distributed Unit (O-DU), O-RAN next generation Node B (O-gNB), O-RAN evolved Node B (O-eNB)), a 5G ultra-wide band (UWB) node, a future generation wireless access device (e.g., a 6G wireless station, a 7G wireless station, or another generation of wireless station), another type of wireless node (e.g., a WiFi device, a WiMax device, a hotspot device, etc.) that provides a wireless access service, or another type of network device that provides a transport service (e.g., routing and forwarding), such as a router, a switch, or another type of layer 3 (e.g., network layer of the Open Systems Interconnection (OSI) model) network device.

External network 115 may include one or multiple networks of one or multiple types and technologies that provides an application service. For example, external network 115 may be implemented using one or multiple technologies including, for example, network function virtualization (NFV), software defined networking (SDN), cloud computing, Infrastructure-as-a-Service (IaaS), Platform-as-a-Service (PaaS), Software-as-a-Service (SaaS), or another type of network technology. External network 115 may be implemented to include a cloud network, a private network, a public network, a multi-access edge computing (MEC) network, a fog network, the Internet, a packet data network (PDN), a service provider network, the World Wide Web (WWW), an Internet Protocol Multimedia Subsystem (IMS) network, a Rich Communication Service (RCS) network, a software-defined (SD) network, a virtual network, a packet-switched network, a data center, or other type of network that may provide access to and may host an end device application service.

Depending on the implementation, external network 115 may include various network devices such as external devices 117. For example, external devices 117 may include virtual network devices (e.g., virtualized network functions (VNFs), servers, host devices, containers, hypervisors, virtual machines (VMs), network function virtualization infrastructure (NFVI), and/or other types of virtualization elements, layers, hardware resources, operating systems, engines, etc.) that may be associated with application services for use by end devices (not illustrated). By way of further example, external devices 117 may include mass storage devices, data center devices, NFV devices, SDN devices, cloud computing devices, platforms, and other types of network devices pertaining to various network-related functions (e.g., security, management, charging, billing, authentication, authorization, policy enforcement, development, etc.). External network 115 may include one or multiple types of core devices 122, as described herein.

External devices 117 may host one or multiple types of application services. For example, the application services may pertain to broadband services in dense areas (e.g., pervasive video, smart office, operator cloud services, video/photo sharing, etc.), broadband access everywhere (e.g., 50/100 Mbps, ultra-low-cost network, etc.), enhanced mobile broadband (eMBB), higher user mobility (e.g., high speed train, remote computing, moving hot spots, etc.), IoTs (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., Short Messaging Service (SMS), Multimedia Messaging Service (MMS), etc.), massive machine-type communications (mMTC), voice, conferencing, instant messaging), video streaming, and/or other types of wireless and/or wired application services. External devices 117 may also include other types of network devices that support the operation of external network 115 and the provisioning of application services, such as an orchestrator, an edge manager, an operations support system (OSS), a local domain name system (DNS), registries, and/or external devices 117 that may pertain to various network-related functions (e.g., security, management, charging, billing, authentication, authorization, policy enforcement, development, etc.). External devices 117 may include non-virtual, logical, and/or physical network devices.

Core network 120 may include one or multiple networks of one or multiple network types and technologies. Core network 120 may include a complementary network of access network 105. For example, core network 120 may be implemented to include a 5G core network, an evolved packet core (EPC) of a Long Term Evolution (LTE) network, an LTE-Advanced (LTE-A) network, and/or an LTE-A Pro network, a future generation core network (e.g., a 5.5G, a 6G, a 7G, or another generation of core network), and/or another type of core network.

Depending on the implementation of core network 120, core network 120 may include diverse types of network devices that are illustrated in FIG. 1 as core devices 122. For example, core devices 122 may include a user plane function (UPF), a Non-3GPP Interworking Function (N3IWF), an access and mobility management function (AMF), a security anchor function (SEAF), a session management function (SMF), a unified data management (UDM) device, a unified data repository (UDR), an authentication server function (AUSF), an authentication credential repository and processing function (ARPF), an AKMA anchor function (AAnF), a network slice selection function (NSSF), a network repository function (NRF), a policy control function (PCF), a network data analytics function (NWDAF), a network exposure function (NEF), a service capability exposure function (SCEF), a lifecycle management (LCM) device, an application function (AF), a mobility management entity (MME), a packet gateway (PGW), an enhanced packet data gateway (ePDG), a serving gateway (SGW), an application function (AF), a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), and/or a charging system (CS).

According to other exemplary implementations, core devices 122 may include additional, different, and/or fewer network devices than those described. For example, core devices 122 may include a non-standard or a proprietary network device, and/or another type of network device that may be well-known but not particularly mentioned herein. Core devices 122 may also include a network device that provides a multi-RAT functionality (e.g., 4G and 5G, 5G and 5.5G, 5G and 6G, etc.), such as an SMF with PGW control plane functionality (e.g., SMF+PGW-C), a UPF with PGW user plane functionality (e.g., UPF+PGW-U), and/or other combined nodes (e.g., an HSS with a UDM and/or UDR, an MME with an AMF, etc.). Also, core devices 122 may include a split core device 122. For example, core devices 122 may include a session management (SM) PCF, an access management (AM) PCF, a user equipment (UE) PCF, and/or another type of split architecture associated with another core device 122, as described herein.

According to various exemplary embodiments, some of access devices 107, external devices 117, and/or core devices 122 may include network devices that provide the per-session validation with secure connection and authentication service, as described herein. For example, according to an exemplary embodiment, core device 122 or external device 117 may include an enforcement orchestration device that includes logic that provides an enforcement orchestration service of the per-session validation with secure connection and authentication service. Additionally, according to another example, access device 107 may include an enforcement device that includes logic that provides an enforcement service of the per-session validation with secure connection and authentication service. By way of further example, enforcement devices may be situated at various network edge locations (e.g., close to end devices 130). According to another example, access device 107 may include both the enforcement orchestration device and the enforcement device. According to still other examples, as explained, the enforcement orchestration device and the enforcement device may be hosted by or co-located with a different configuration relating to access network 105, external network 115, and/or core network 120.

According to an exemplary embodiment, the enforcement orchestration device may manage one or multiple enforcement devices, as described herein. According to an exemplary embodiment, the enforcement orchestration device may provide (centralized) communication, on behalf of the enforcement device(s) managed, to core network 120. For example, the enforcement orchestration device may obtain information (e.g., location information of end device 130, key information, user information, and/or other information) from core device 122 (e.g., a NEF, an AMF, a UDM or another suitable core device 122). The enforcement orchestration device may select an enforcement device to serve end device 130 based on the location of end device 130, distribute information to the selected enforcement device, maintain security policies and distribute the security policies to enforcement device(s), manage connections between a client of end device 130 and the enforcement device, and/or other types of processes and/or functions, as described herein.

Additionally, according to an exemplary embodiment, the enforcement device may perform various security-related controls and operations, such as establishing a secure connection between the enforcement device and a client of end device 130, authenticating a user of end device 130, applying security policies and/or rules at a session level based on user/end device privileges, establishing upstream/downstream communication with other network devices (e.g., external devices 117), providing encryption, inspecting of traffic, logging session information, serving as a proxy for the enforcement orchestration device, serving as a DNS name on behalf of the enforcement orchestration device, and/or other types of processes and/or functions, as described herein.

End device 130 includes a device that may have communication capabilities (e.g., wireless, wired, optical, etc.). End device 130 may or may not have computational capabilities. End device 130 may be implemented as a mobile device, a portable device, a stationary device (e.g., a non-mobile device and/or a non-portable device), a device operated by a user, or a device not operated by a user. For example, end device 130 may be implemented as a smartphone, a mobile phone, a personal digital assistant, a tablet, a netbook, a phablet, a wearable device (e.g., a watch, glasses, etc.), a computer, a gaming device, a music device, an IoT device, a drone, a smart device, or other type of wireless device (e.g., other type of UE). End device 130 may be configured to execute various types of software (e.g., applications, programs, etc.). The number and the types of software may vary among end devices 130. End devices 130 may include "edge-aware" and/or "edge-unaware" application service clients. For purposes of description, end device 130 is not considered a network device.

According to an exemplary embodiment, end device 130 may include a client that provides the per-session validation with secure connection and authentication service, as described herein. For example, the client may include establishing a secure connection with the enforcement orchestration device and provide key information, establishing a secure connection with the enforcement device for all application sessions, provide key information, perform user authentication, among other processes and functions, as described herein.

According to some exemplary embodiments, end device 130 and the client may serve as a mobile Wi-Fi (Mi-Fi) access point, hot spot, or other wireless access point for or on behalf of one or multiple other end devices 130. According to such an exemplary embodiment, each end device 130 may be subject to the per-session validation with secure connection and authentication service, as described herein.

Figure 2A:
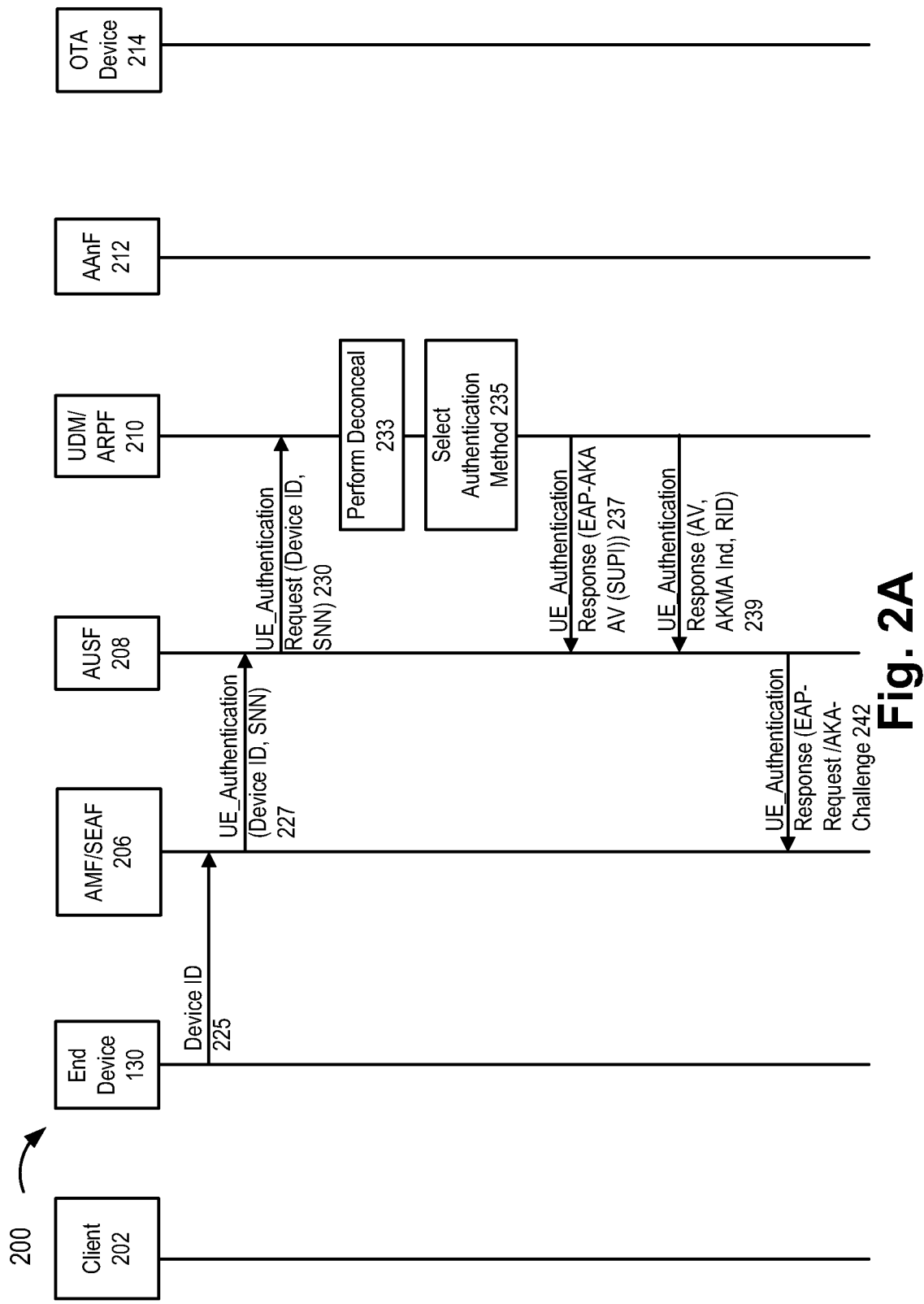
FIGS. 2A-2C are diagrams illustrating an exemplary process of an exemplary embodiment of the per-session validation with secure connection and authentication service.
Figure 2B:
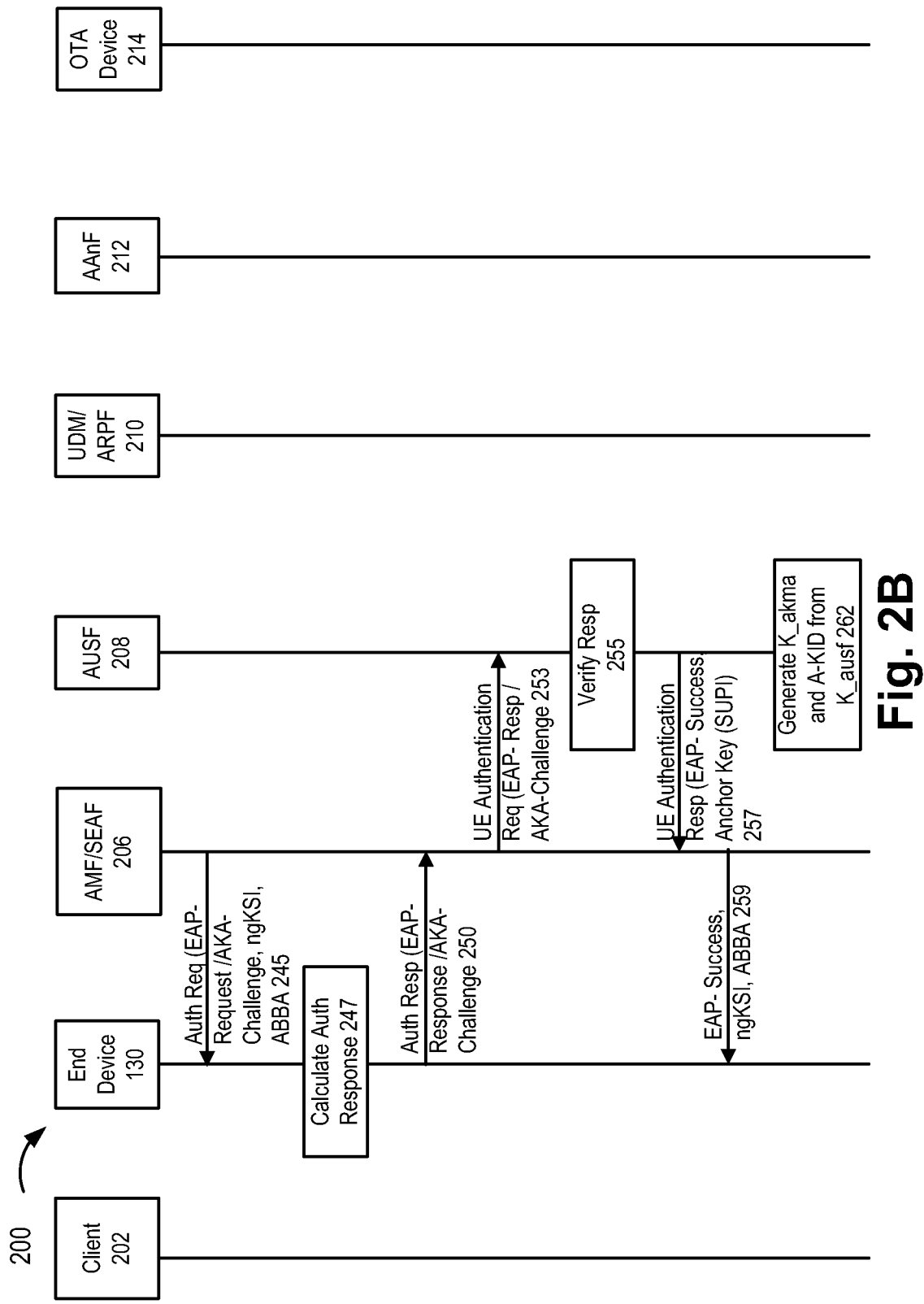
Figure 2C:
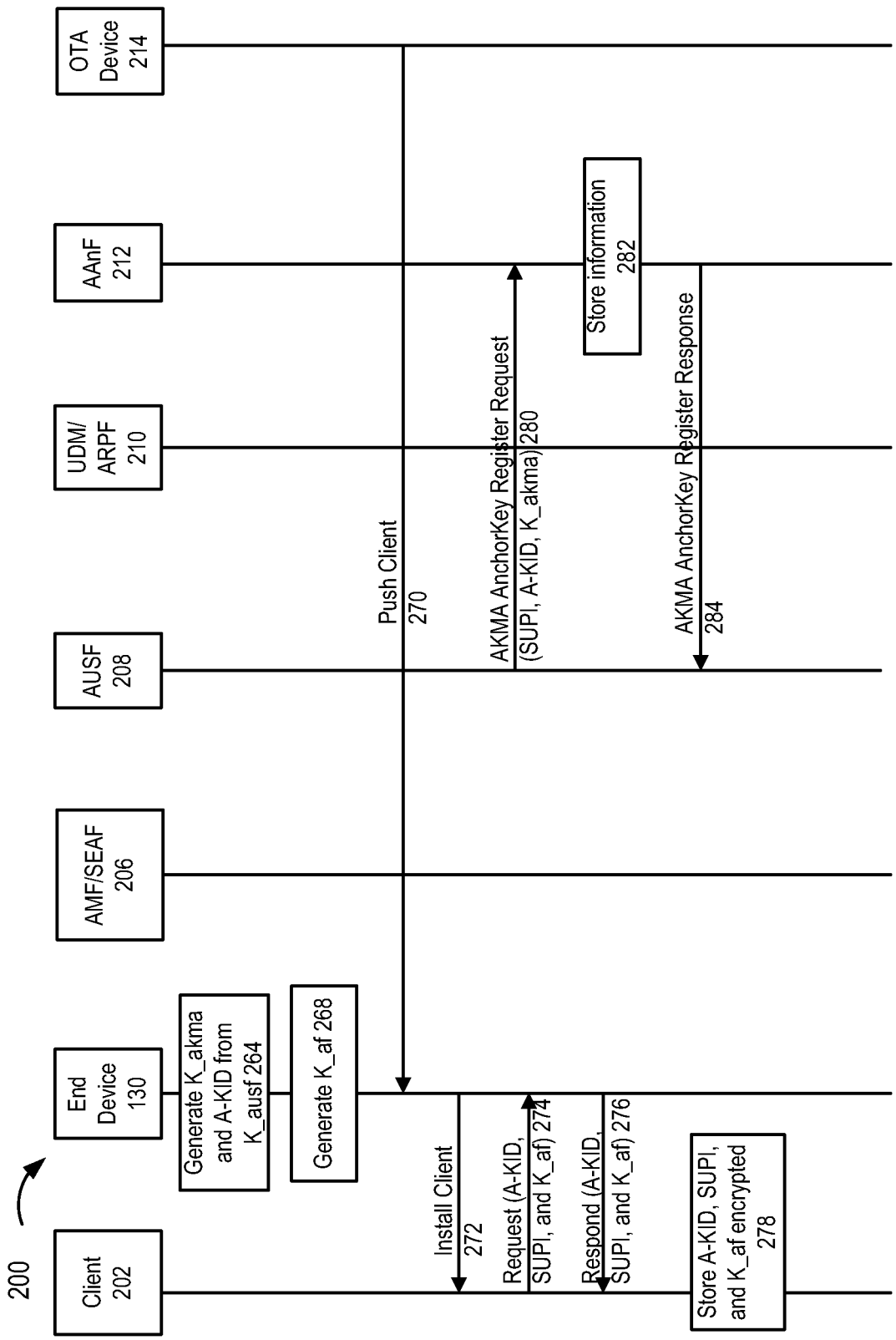

FIGS. 2A-2C are diagrams illustrating an exemplary process 200 of an exemplary embodiment of the per-session validation with secure connection and authentication service according to an exemplary scenario. As illustrated, process 200 may implemented in an environment that includes end device 130 (and a client 202), core devices 122, such as an AMF and/or an SEAF (AMF/SEAF) 206, an AUSF 208, a UDM and/or an ARPF (UDM/ARPF) 210, and an AAnF 212, and external device 117, such as an OTA device 214. As described in relation to FIG. 1, according to other exemplary embodiments, the environment may include other types of core devices 122, not specifically illustrated and described in FIGS. 2A-2C. The messages illustrated and described are exemplary. Additionally, process 200 may include additional, different, and/or fewer messages and/or communications between core devices 122 and/or other devices in which an authentication procedure between end device 130 and core network 120 is implemented depending on context, type of core network 120 (e.g., 5.5G, or another generation), and other factors.

AMF/SEAF 206, AUSF 208, UDM/ARPF 210, and AAnF 212 may each provide a function and/or a service in accordance with a network standard (e.g., 3GPP, 3GPP2, ITU, ETSI, GSMA, and/or the like) and/or of a proprietary nature. For example, an AMF may provide registration, connection, reachability, and mobility management, security context management, location service management, UE mobility event notification, among other functions. An SEAF may serve as an intermediary network device between end device 130 and core network 120, and may obtain an anchor key (e.g., from an AUSF) that is bound to a serving network, among other functions. An AUSF may make decisions relating to end device authentication, among other functions. A UDM may provide user identification handling, support service/session continuity, subscription management, generation of AKA authentication credentials, among other functions. An ARPF may select an authentication method based on subscriber identity and configured policies, and may calculate authentication data and keys for the AUSF, among other functions. An AAnF 212 may store AKMA related key material and provide AKMA Application Key information, among other AKMA services.

OTA device 214 may be implemented as an OTA server, an OTT server, a web server, or another type of server device that may be configured to provision end device 130 with client 202, as described herein. Client 202 of end device may include logic that provides an exemplary embodiment of the per-session validation with secure connection and authentication service.

Referring to FIG. 2A, according to an exemplary scenario, assume that end device 130 initiates an authentication procedure (e.g., primary authentication) that includes end device 130 transmitting a message 225, which includes a device identifier. According to various exemplary embodiments, the device identifier may be implemented as a subscription permanent identifier (SUPI), a subscription concealed identifier (SUCI), a globally unique temporary identifier (GUTI), or the like, or a combination of identifiers. AMF/SEAF 206 may receive message 225 and generate and transmit an authentication request message 227, which may include a device identifier and a serving network name (SNN), to AUSF 208. In response to receiving message 227, AUSF 208 may generate and transmit an authentication request message 230 to UDM/ARPF 210, as illustrated. UDM/ARPF 210 may optionally de-conceal 233 a SUCI to a SUPI when the device identifier is the SUCI. Additionally, or alternatively, UDM/ARPF 210 may select an authentication method 235. For example, the authentication procedure may be for Extensible Authentication Protocol (EAP)-Authentication and Key Agreement (AKA), 5G AKA, or another type of authentication procedure.

According to this exemplary scenario, UDM/ARPF 210 may generate and transmit an authentication response 237, which may indicate that the SUPI may be used to derive the authentication vector (AV) associated with an EAP-AKA approach. As further illustrated, UDM/ARPF 210 may generate and transmit an authentication response 239, which may indicate (e.g., AKMA Ind) that AKMA may be generated based on the routing identifier (RID) of end device 130. Responses 237 and 239 may be received by AUSF 208. In response, AUSF 208 may initiate an AKA challenge procedure with end device 130, via messages 242 through 253 and includes end device 130 calculating an authentication response 247, as illustrated in FIGS. 2A and 2B. Referring to FIG. 2B, AUSF 208 may verify 255 the authentication response from end device 130. According to this exemplary scenario, the authentication was successfully verified, and AUSF 208 may generate and transmit an authentication response, which may indicate the success and may include an AKMA Anchor key that is generated based on the SUPI of end device 130, to AMF/SEAF 206.

In response to message 257, AMF/SEAF 206 may generate and transmit a message 259 to end device 130. Message 259 may indicate the success and may include an ngKSI, which may identify a partial native 5G non-access stratum (NAS) security context when the authentication is successful, and an ABBA parameter, which may enable a bidding down protection of security features.

As further illustrated in FIG. 2B, when AUSF 208 receives the AKMA indication from UDM/ARPF 210 (e.g., in message 239 of FIG. 2A), AUSF 208 may generate and store 262 an AKMA Anchor Key (K_AKMA) and an A-KID. AUSF 208 may perform the generation and storage after the primary authentication procedure is successfully completed. AUSF 208 may generate the K-AKMA and the A-KID based on a key of AUSF 208 (K_ausf).

Referring to FIG. 2C, end device 130 may also generate and store 264 an AKMA Anchor Key (K_AKMA) and an A-KID based on K_ausf. Additionally, end device 130 may generate or derive 268 a key for an AKMA Application Function (AF) (K_af) based on the K_AKMA.

According to an exemplary embodiment of process 200, although not illustrated, OTA device 214 may be notified (e.g., by core device 122) that end device 130 has successfully completed registration and authentication. Additionally, the notification may indicate that end device 130 is not configured with client 202. As such, OTA device 214 may push client 270 to end device 130, for example. The connection may be secure and OTA device 214 may be provided with a device identifier (e.g., SUPI, etc.) of end device 130 among other information. After receipt, end device 130 may install 272 client 202. Subsequent to installation, client 202 may communicate with end device 130 to obtain the A-KID, the SUPI, and the K_af, as illustrated in messages 274 and 276. Client 202 may store 278 the A-KID, the SUPI, and the K_af encrypted. Client 202 may be configured with a network address of an enforcement orchestration device, as described herein.

As further illustrated in FIG. 2C, after the K_AKMA is generated, AUSF 208 may select AAnF 212 and send the generated A-KID, K_AKMA, along with the SUPI of end device 130 according to a Key Registration procedure of message 280. AAnF 212 may store 282 the information, and provide a registration response 284 to AUSF 208. The A-KID identifies of K-AKMA of end device 130.

FIGS. 2A-2C are diagrams illustrating an exemplary process of an exemplary embodiment of the per-session validation with secure connection and authentication service. According to other exemplary embodiments and scenarios, the process may include additional operations, fewer operations, and/or different operations. The messages and the content of the messages illustrated and described in process 200 are exemplary and may be different depending on the primary authentication procedure implemented in a network, such as a core network. Additionally, the network devices illustrated and described are exemplary. For example, according to other exemplary embodiments, process 200 may be implemented in whole or in part via network devices of a 4G core network (e.g., HSS, MME, etc.) and/or a future generation core network (e.g., 5.5G, 6G, etc.).

Figure 3:
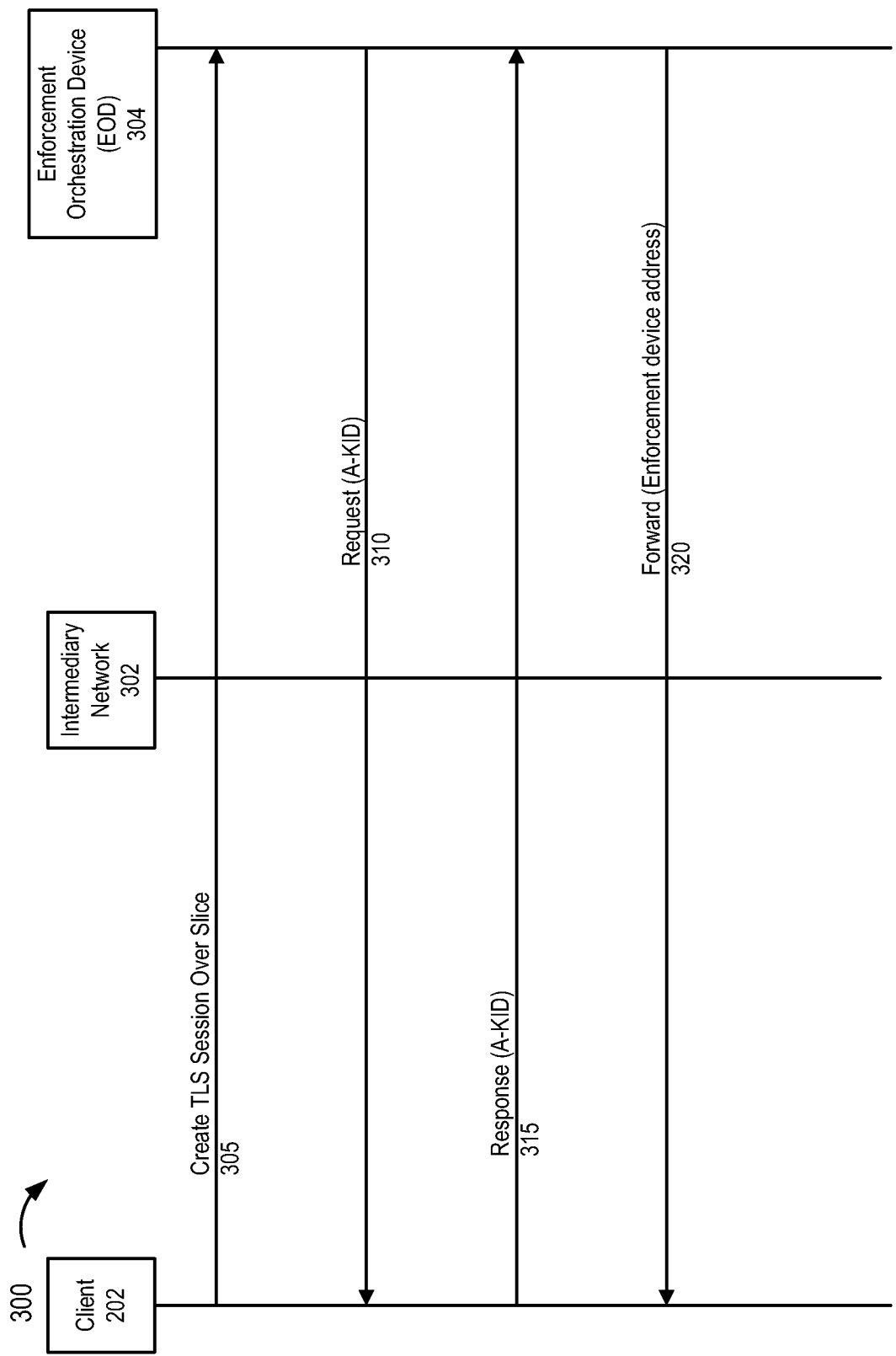
FIG. 3 is a diagram illustrating another exemplary process of an exemplary embodiment of the per-session validation with secure connection and authentication service.

FIG. 3 is a diagram illustrating an exemplary process 300 of an exemplary embodiment of the per-session validation with secure connection and authentication service according to an exemplary scenario. As illustrated, process 300 may implemented in an environment that includes client 202 of end device 130, intermediary network 302, and an enforcement orchestration device (EOD) 304. The messages illustrated and described are exemplary. Additionally, process 300 may include additional, different, and/or fewer messages and/or communications between client 202 and enforcement orchestration device 304. Intermediary network 302 may include one or multiple networks, such as access network 105, external network 115, and/or core network 120. Enforcement orchestration device 304 may include logic that provides an exemplary embodiment of the per-session validation with secure connection and authentication service, as described herein. Process 300 may be performed after process 200 is completed.

Referring to FIG. 3, client 202 (via end device 130 not illustrated) may automatically initiate a secure connection with enforcement orchestration device 304 in response to performance of step 278 of FIG. 2C. For example, the secure connection may be implemented via an administrative network slice in which a one-way Transport Layer Security (TLS) authentication session may be performed. Client 202 may transmit a certificate (e.g., a TLS certificate or the like), which was installed as a part of the installation process of client 202, to enforcement orchestration device 304. As illustrated in messages 310 and 315, client 202 and enforcement orchestration device 304 may share A-KIDs. Based on receiving the A-KID of end device 130/client 202, enforcement orchestration device 304 may perform processes 400 and 500, as described herein, and then generate a message 320 that includes a network address of an enforcement device.

Figure 4:
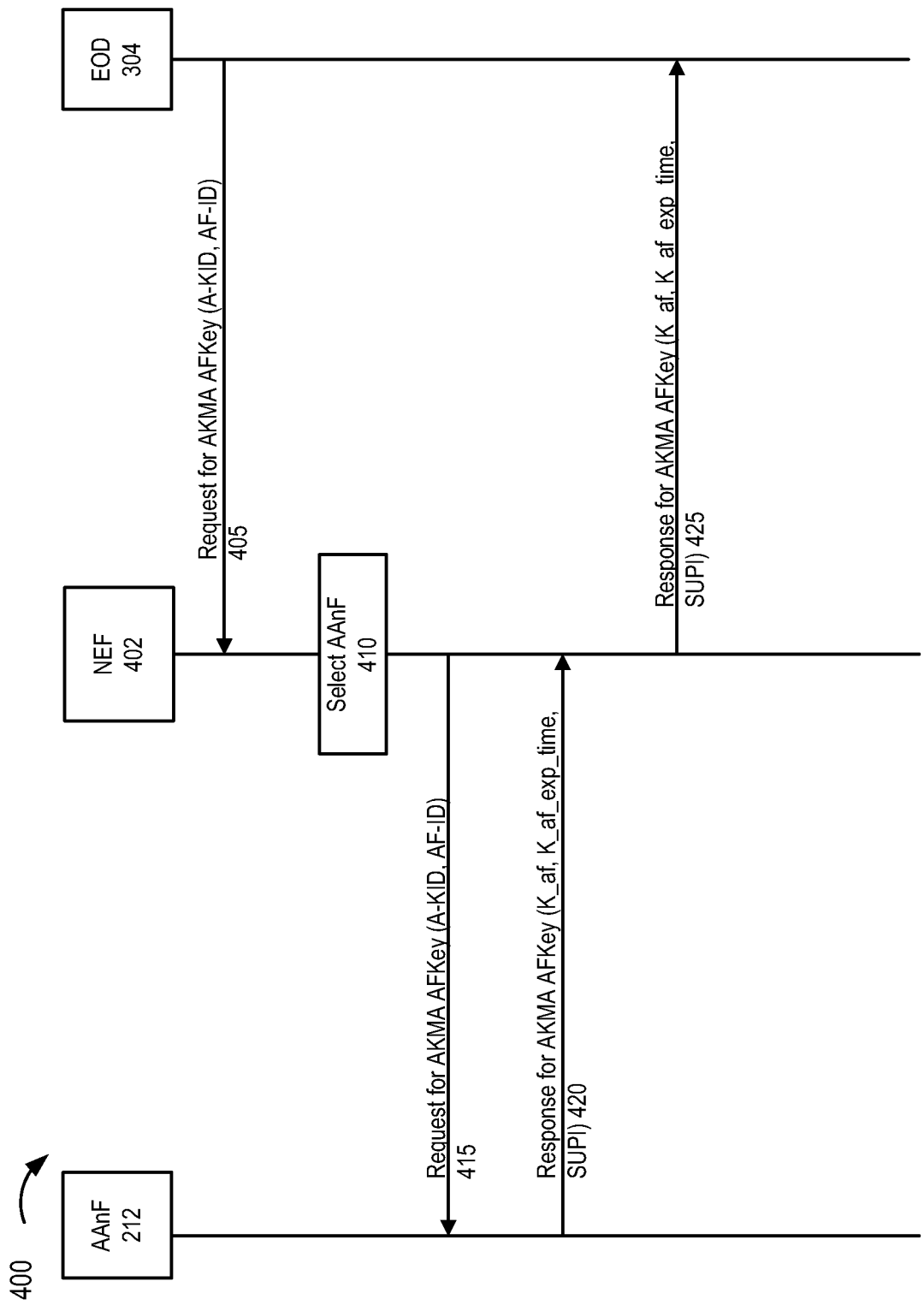
FIG. 4 is a diagram illustrating still another exemplary process of an exemplary embodiment of the per-session validation with secure connection and authentication service.

FIG. 4 is a diagram illustrating an exemplary process 400 of an exemplary embodiment of the per-session validation with secure connection and authentication service according to an exemplary scenario. As illustrated, process 400 may implemented in an environment that includes AAnF 212, enforcement orchestration device 304, and a core device 122, such as a NEF 402. The messages illustrated and described are exemplary. Process 400 may be performed in response to receiving response 315 of process 300.

Referring to FIG. 4, enforcement orchestration device 304 may generate and transmit a message 405, which includes a request for an AKMA application key from an AAnF via NEF 402. As illustrated, request message 405 may include an A-KID and an identifier of enforcement orchestration device 304 (e.g., AF-ID). Based on receiving message 405, if enforcement orchestration device 304 is authorized by NEF 402 to request a key for enforcement orchestration device 304 (e.g., K_af), NEF 402 may discover and select 410 an AAnF (e.g., AAnF 212). As further illustrated, NEF 402 may generate and transmit an AKMA AFkey request 415, which may include the A-KID and the AF-ID, to the selected AAnF 212. In response, AAnF 212 may process the request and generate the K_af. AAnF 212 may generate and transmit AKMA AFkey response 420, which may include the K_af, a K_af expiration time, and the SUPI of end device 130/client 202, to NEF 402. NEF 402 may forward the response 425 to enforcement orchestration device 304.

Figure 5:
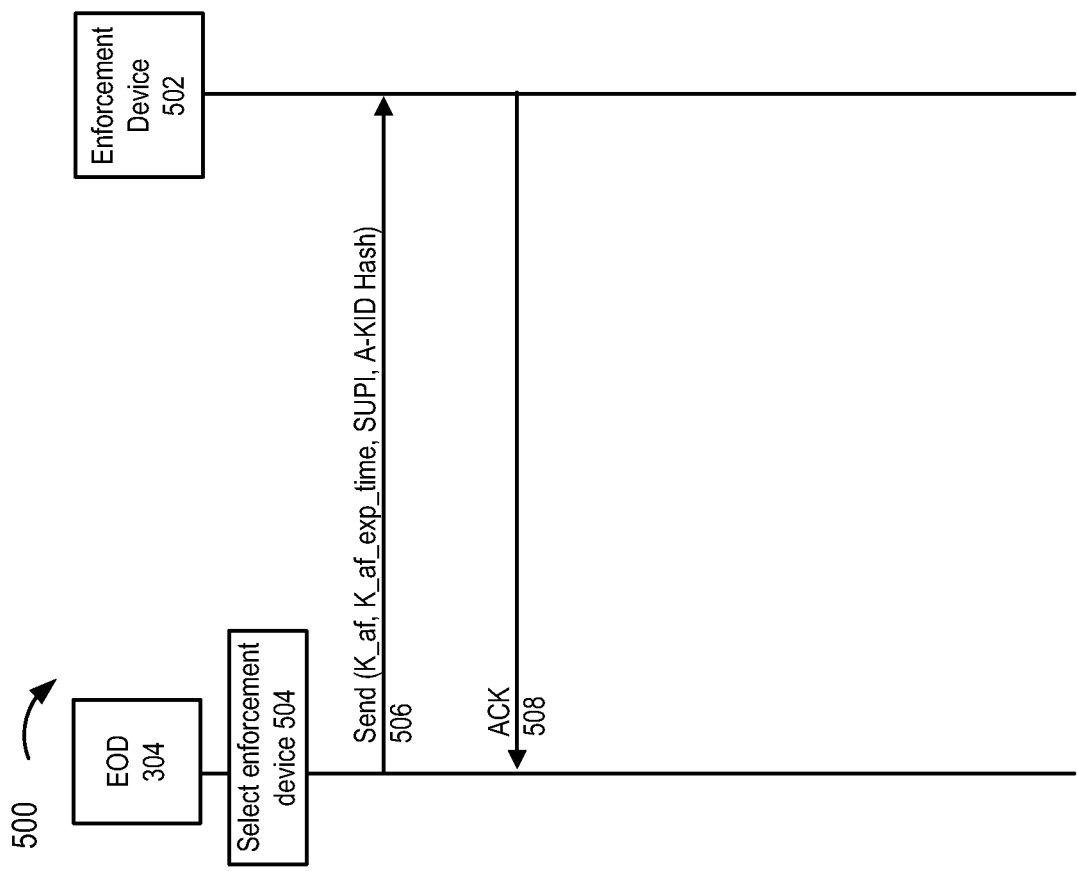
FIG. 5 is a diagram illustrating yet another exemplary process of an exemplary embodiment of the per-session validation with secure connection and authentication service.

FIG. 5 is a diagram illustrating an exemplary process 500 of an exemplary embodiment of the per-session validation with secure connection and authentication service according to an exemplary scenario. As illustrated, process 500 may implemented in an environment that includes enforcement orchestration device 304 and an enforcement device 502. The messages illustrated and described are exemplary. Process 500 may be performed after process 400 is completed.

Referring to FIG. 5, as illustrated, based on the SUPI of end device 130/client 202 enforcement orchestration device 304 may select 504 an enforcement device. For example, although not illustrated, enforcement orchestration device 304 may request location information of end device 130/client 202 from NEF 402 and an associated 5G location service. Enforcement orchestration device 304 may select 504 the enforcement device (e.g., enforcement device 502) that is closest to end device 130. According to some exemplary implementations, enforcement orchestration device 304 may select the enforcement device based on criteria other than location relative to end device 130/client 202, such as load, number of sessions, number of end devices 130 currently serviced by the enforcement device, congestion information relating to access device(s) 107 and/or core device(s) 122, and/or the like. Based on the selection of enforcement device 502, enforcement orchestration device 304 may generate and transmit a message 506, which includes the K_af, the K_af_expiration_time, the SUPI, and the A-KID hash, for example, to enforcement device 502. In response to receiving message 506, enforcement device 502 may transmit an acknowledgement 508 to enforcement orchestration device 304. Enforcement device 502 may store this information.

Figure 6:
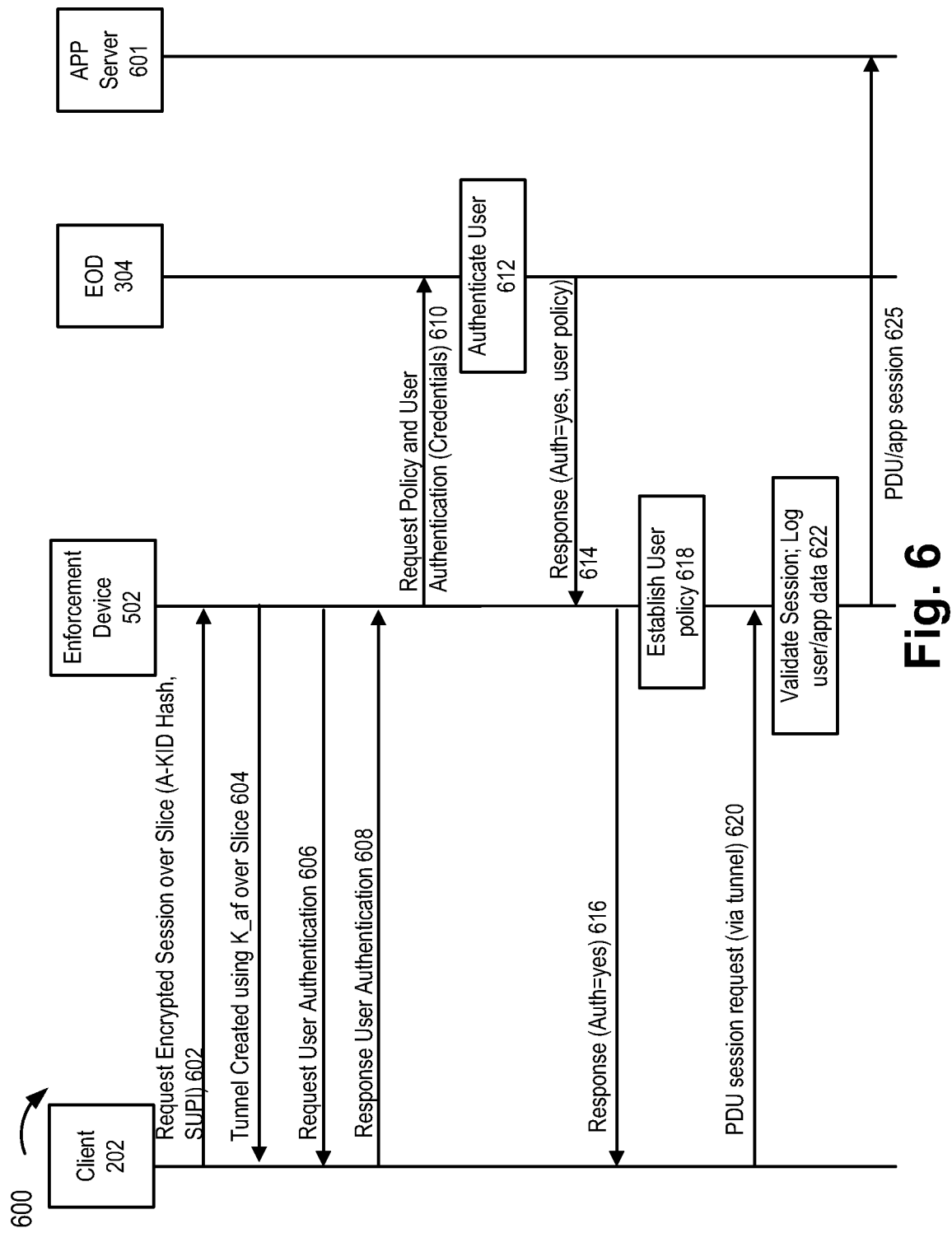
FIG. 6 is a diagram illustrating another exemplary process of an exemplary embodiment of the per-session validation with secure connection and authentication service.

FIG. 6 is a diagram illustrating an exemplary process 600 of an exemplary embodiment of the per-session validation with secure connection and authentication service according to an exemplary scenario. As illustrated, process 600 may implemented in an environment that includes client 202, enforcement orchestration device 304, enforcement device 502, and an application server 601. Application server 601 may provide an end device application service, for example. The messages illustrated and described are exemplary. Process 500 may be performed after process 600 is completed.

Referring to FIG. 6, client 202 may generate and transmit a request 602 for an encrypted session over a network slice to enforcement device 502. Client 202 may automatically generate and transmit request 602 in response to a user executing an end device application on end device 130. In this way, any and all end device application session may be subject to the per-session validation with secure connection and authentication service, as described herein. Alternatively, client 202 may automatically generate and transmit request 602 in response to receiving the address of enforcement device 502, as illustrated in 320 of FIG. 3. Request 602 may include the A-KID hash and the SUPI of end device 130. In response, enforcement device 502 may create 604 an encrypted secure tunnel with client 202 based on the K_af. As further illustrated, enforcement device 502 may transmit a request for user authentication 606 to client 202. Upon receipt, a user (not illustrated) may be prompted to provide credentials (e.g., username and/or password), and client 202 may generate and transmit a response for user authentication 608 to enforcement device 502.

According to this example, enforcement device 502 may generate and transmit a request for policy and user authentication 610, which may include the SUPI and the credentials, to enforcement orchestration device 304. Upon receipt, enforcement orchestration device 304 may validate/authenticate the user 612. For example, enforcement orchestration device 304 may store repository of user credentials associated with various users. Enforcement orchestration device 304 may perform a lookup based on the SUPI, for example. Additionally, based on the successfully authentication, enforcement orchestration device 304 may lookup the user's network access privileges/policies. The network access privileges/policies may govern which application services the user/end device 130/client 202 is/are able to access. As illustrated, enforcement orchestration device 304 may generate and transmit a response 614, which may indicate successful authentication of the user and may include the user policies pertaining to the user of client 202. Enforcement device 502 may generate and transmit a response 616, which indicates successful authentication, to client 202. Enforcement device 502 may store and apply the user policies 618 for any PDU session requests received from client 202.

As an example, assume that the user launches an application on end device 130, and a PDU or application session request 620 is transmitted via the secure tunnel to enforcement device 502. Upon receipt, enforcement device 502 may validate the PDU/application session request based on the configured policies for this user. According to this exemplary scenario, the policies may permit the user to access application server 601. As such, enforcement device 502 may forward the PDU/application session request 625 to application server 601. Additionally, enforcement device 502 may log user/application/session data associated with the PDU/application session. The logged data may be used to generate a behavioral profile relating to the user. According to some exemplary embodiments, enforcement device 502 may transmit the logged data to enforcement orchestration device 304 or an artificial intelligence (AI)/machine learning ML) device (not illustrated), which may generate the behavioral profile. Based on the behavioral/historical profile, reactive measures relating to prospective PDU/application session requests may be invoked. For example, enforcement device 502 may be configured, based on the behavioral profile, to identify a PDU/application session request that is initiated on an odd day and/or time, or that an application which has never been used before is now initiating a PDU/application session request via client 202. Enforcement device 502 may block such requests or initiate additional security procedures.

Figure 7:
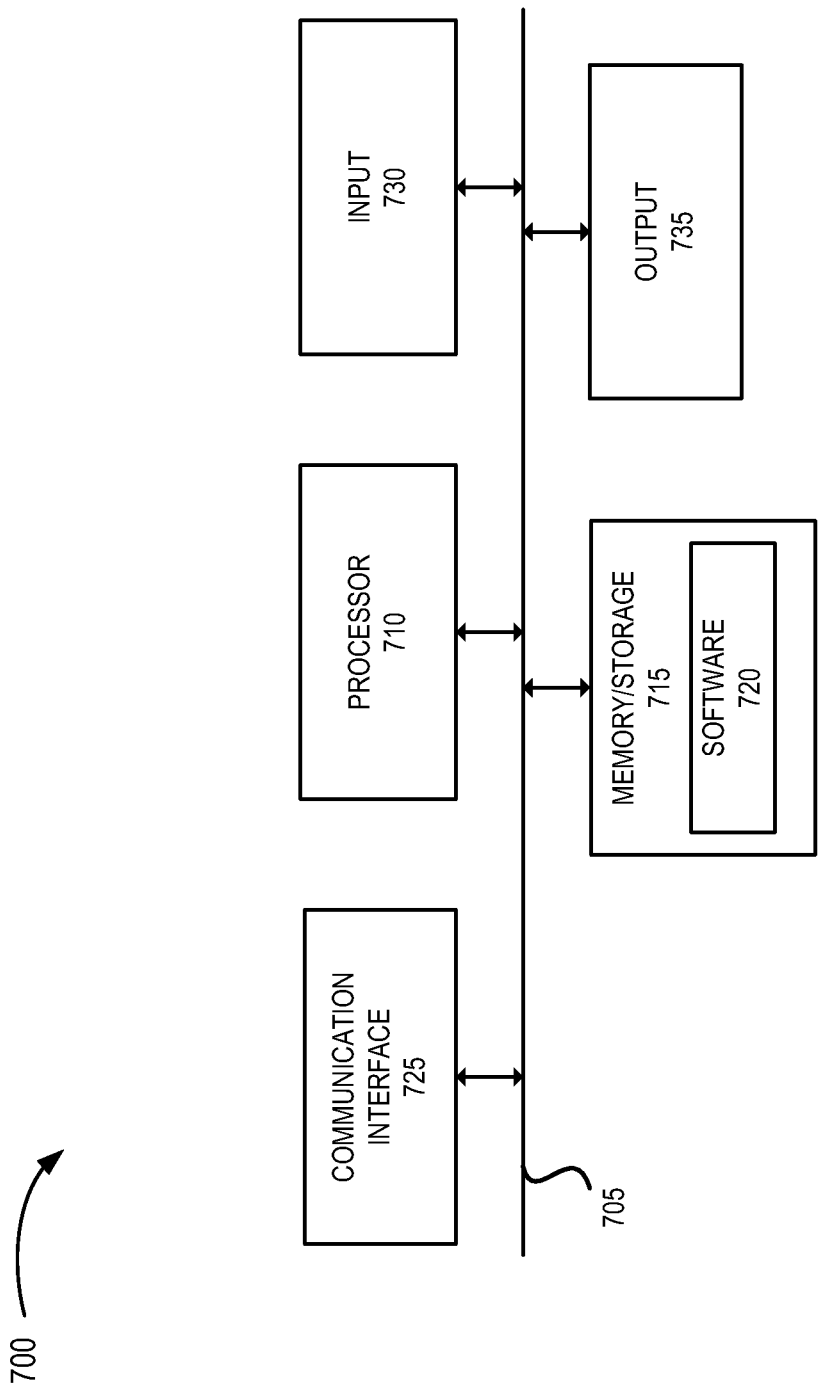
FIG. 7 is a diagram illustrating exemplary components of a device that may correspond to one or more of the devices illustrated and described herein.

FIG. 7 is a diagram illustrating exemplary components of a device 700 that may be included in one or more of the devices described herein. For example, device 700 may correspond to access device 107, external device 117, core device 122, end device 130, AMF/SEAF 206, AUSF 208, UDM/ARPF 210, AAnF 212, OTA device 214, enforcement orchestration device 304, NEF 402, enforcement device 502, and/or other types of devices, as described herein. As illustrated in FIG. 7, device 700 includes a bus 705, a processor 710, a memory/storage 715 that stores software 720, a communication interface 725, an input 730, and an output 735. According to other embodiments, device 700 may include fewer components, additional components, different components, and/or a different arrangement of components than those illustrated in FIG. 7 and described herein.

Bus 705 includes a path that permits communication among the components of device 700. For example, bus 705 may include a system bus, an address bus, a data bus, and/or a control bus. Bus 705 may also include bus drivers, bus arbiters, bus interfaces, clocks, and so forth.

Processor 710 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 710 may be implemented as hardware (e.g., a microprocessor, etc.), a combination of hardware and software (e.g., a SoC, an ASIC, etc.), may include one or multiple memories (e.g., cache, etc.), etc.

Processor 710 may control the overall operation, or a portion of operation(s) performed by device 700. Processor 710 may perform one or multiple operations based on an operating system and/or various applications or computer programs (e.g., software 720). Processor 710 may access instructions from memory/storage 715, from other components of device 700, and/or from a source external to device 700 (e.g., a network, another device, etc.). Processor 710 may perform an operation and/or a process based on various techniques including, for example, multithreading, parallel processing, pipelining, interleaving, learning, model-based, etc.

Memory/storage 715 includes one or multiple memories and/or one or multiple other types of storage mediums. For example, memory/storage 715 may include one or multiple types of memories, such as, a random access memory (RAM), a dynamic RAM (DRAM), a static RAM (SRAM), a cache, a read only memory (ROM), a programmable ROM (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 715 may include a hard disk (e.g., a magnetic disk, an optical disk, a magneto-optic disk, a solid-state component, etc.), a Micro-Electromechanical System (MEMS)-based storage medium, and/or a nanotechnology-based storage medium.

Memory/storage 715 may be external to and/or removable from device 700, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 715 may store data, software, and/or instructions related to the operation of device 700.

Software 720 includes an application or a program that provides a function and/or a process. As an example, with reference to enforcement orchestration device 304, software 720 may include an application that, when executed by processor 710, provides a function and/or a process of per-session validation with secure connection and authentication service, as described herein. Additionally, with reference to enforcement device 502, software 720 may include an application that, when executed by processor 710, provides a function and/or a process of per-session validation with secure connection and authentication service, as described herein. Software 720 may also include firmware, middleware, microcode, hardware description language (HDL), and/or other form of instruction. Software 720 may also be virtualized. Software 720 may further include an operating system (OS) (e.g., Windows, Linux, Android, proprietary, etc.).

Communication interface 725 permits device 700 to communicate with other devices, networks, systems, and/or the like. Communication interface 725 includes one or multiple wireless interfaces, optical interfaces, and/or wired interfaces. For example, communication interface 725 may include one or multiple transmitters and receivers, or transceivers. Communication interface 725 may operate according to a protocol stack and a communication standard.

Input 730 permits an input into device 700. For example, input 730 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 735 permits an output from device 700. For example, output 735 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, PaaS, etc.). Device 700 may be implemented in the same manner. For example, device 700 may be instantiated, created, deleted, or some other operational state during its life-cycle (e.g., refreshed, paused, suspended, rebooting, or another type of state or status), using well-known virtualization technologies. For example, access device 107, core device 122, external device 117, and/or another type of network device or end device 130, as described herein, may be a virtualized device.

Device 700 may perform a process and/or a function, as described herein, in response to processor 710 executing software 720 stored by memory/storage 715. By way of example, instructions may be read into memory/storage 715 from another memory/storage 715 (not shown) or read from another device (not shown) via communication interface 725. The instructions stored by memory/storage 715 cause processor 710 to perform a function or a process described herein. Alternatively, for example, according to other implementations, device 700 performs a function or a process described herein based on the execution of hardware (processor 710, etc.).

Figure 8:
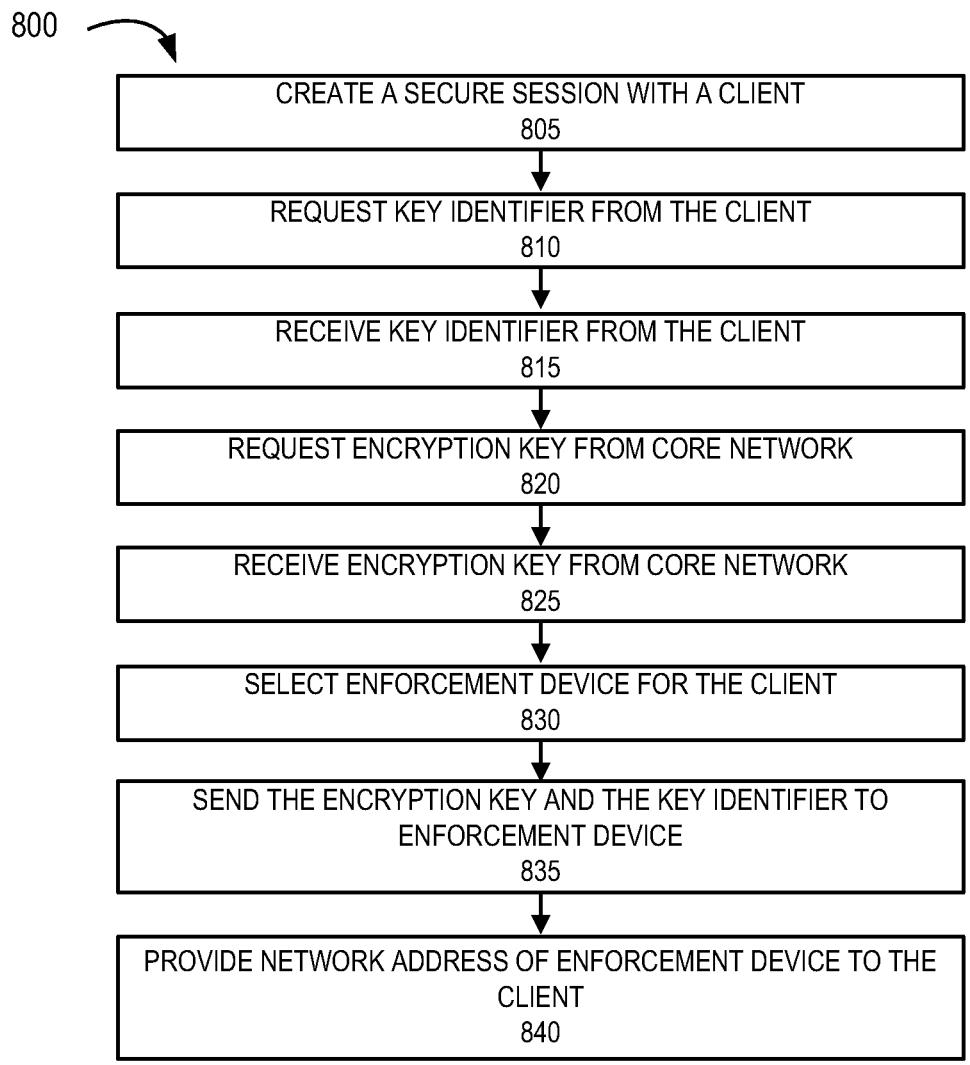
FIG. 8 is a flow diagram illustrating an exemplary process of an exemplary embodiment of the per-session validation with secure connection and authentication service.

FIG. 8 is a flow diagram illustrating an exemplary process 800 of an exemplary embodiment of the per-session validation with secure connection and authentication service. According to an exemplary embodiment, enforcement orchestration device 304 may perform a step of process 800. According to an exemplary implementation, processor 710 executes software 720 to perform a step of process 800, as described herein. Alternatively, a step may be performed by execution of only hardware. Process 800 may be performed responsive to completion of the install procedure of client 202 at end device 130, as described herein.

In block 805, enforcement orchestration device 304 may receive a request to create a secure session from client 202. For example, the secure session may be created via an administrative network slice. The secure session may be implemented as a one way TLS session using a certificate for enforcement orchestration device 304. Client 202 may be pre-loaded with a network address of enforcement orchestration device 304.

In block 810, enforcement orchestration device 304 may generate and transmit a request for a key identifier from client 202. For example, the key identifier may be an A-KID, which may identify an AKMA key of end device 130 pertaining to a successful primary authentication and registration procedure between end device 130 of client 202 and core network 120, as described herein.

In block 815, enforcement orchestration device 304 may receive the key identifier from client 202. For example, enforcement orchestration device 304 may receive the A-KID from client 202. Enforcement orchestration device 304 may compare the received A-KID to an A-KID of end device 130 and associated successful primary authentication and registration procedure.

In block 820, enforcement orchestration device 304 may transmit a request for an encryption key from core network 120. For example, enforcement orchestration device 304 may transmit an AKMA AF key request to a NEF of core network 120 that successfully performed the primary authentication and registration procedure.

In block 825, enforcement orchestration device 304 may receive the encryption key from core network 120. For example, enforcement orchestration device 304 may receive an encryption key (K_af), expiration time information for K_af, and the SUPI of end device 130.

In block 830, enforcement orchestration device 304 may select enforcement device 502 based on the location of end device 130/client 202 and/or other criteria, as described herein.

In block 835, enforcement orchestration device 304 may provide the encryption key and the key identifier to enforcement device 502. For example, enforcement orchestration device 304 may transmit an encryption key (K_af), encryption information (e.g., expiration time), the SUPI, and an A-KID hash to the selected enforcement device 502.

In block 840, enforcement orchestration device 304 may provide a network address of the selected enforcement device 502 to client 202.

FIG. 8 illustrates an exemplary process of the per-session validation with secure connection and authentication service, according to other exemplary embodiments, the per-session validation with secure connection and authentication service may perform additional operations, fewer operations, and/or different operations than those illustrated and described.

Figure 9:
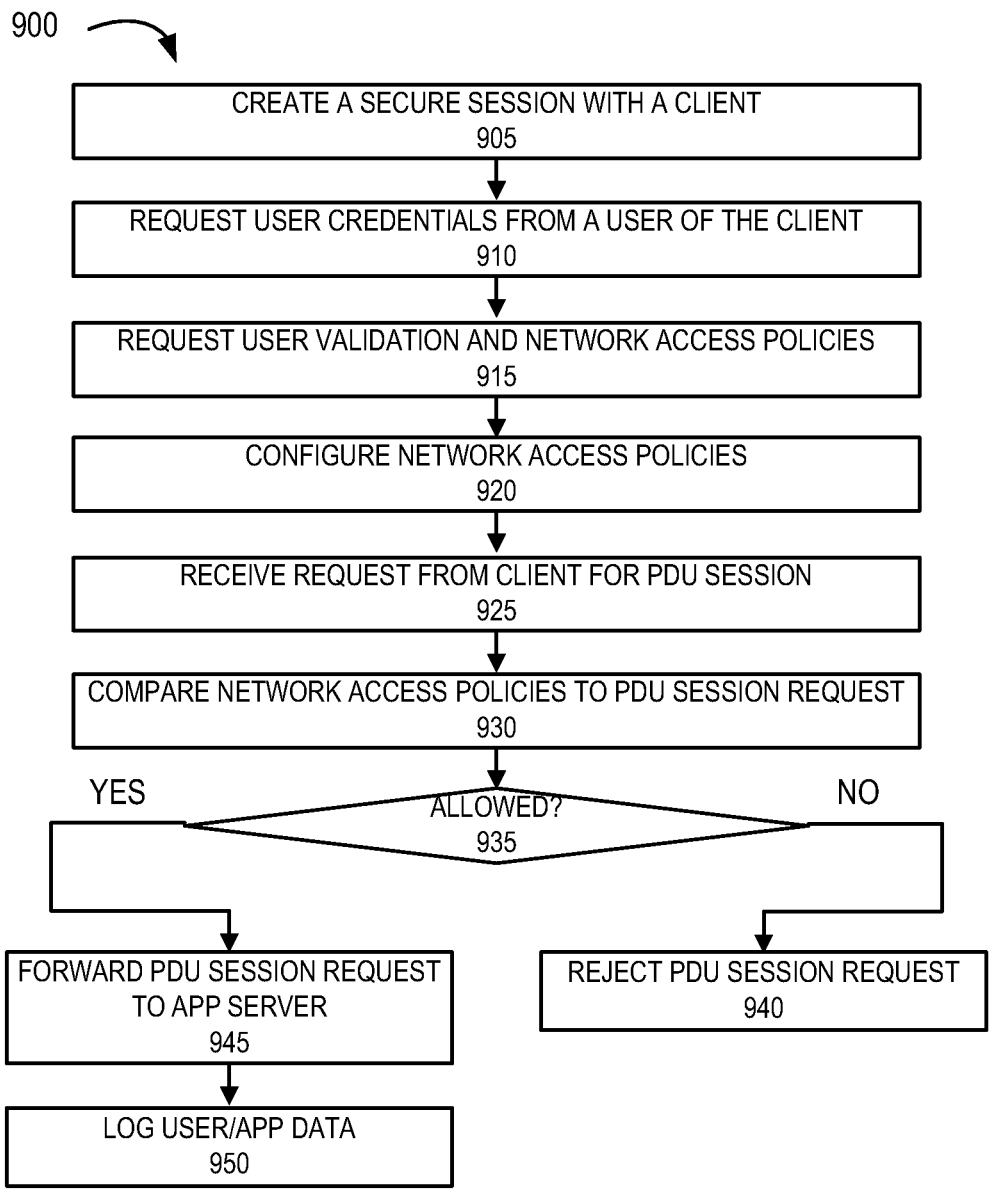
FIG. 9 is a diagram illustrating another exemplary process of an exemplary embodiment of the per-session validation with secure connection and authentication service.

FIG. 9 is a flow diagram illustrating yet another exemplary process 900 of an exemplary embodiment of the per-session validation with secure connection and authentication service. According to an exemplary embodiment, enforcement device 502 may perform a step of process 900. According to an exemplary implementation, processor 710 executes software 720 to perform a step of process 900, as described herein. Alternatively, a step may be performed by execution of only hardware.

In block 905, enforcement device 502 may create a secure encrypted session with client 202. For example, enforcement device 502 may receive a request, which may include an A-KID hash via a network slice. Enforcement device 502 may create a secure tunnel using a key (e.g., K_af) to create an encrypted session.

In block 910, enforcement device 502 may request user credentials from client 202. According to some exemplary embodiments, user authentication may be omitted. In block 915, enforcement device 502 may receive the user credentials and request validation of the user credentials and network access polices pertaining to the end device 130/client 202.

In block 920, enforcement device 502 may receive the network access polices from enforcement orchestration device 304. Enforcement device 502 may also receive a result of the user authentication. Enforcement device 502 may forward the result of the user authentication to client 202. According to some exemplary implementations, when the user authentication is a failure, client 202 may be blocked from establishing a PDU session with external device 117.

In block 925, enforcement device 502 may receive a request to establish a PDU session with external device 117 (e.g., application server 601). In bock 930, enforcement device 502 may compare the network access policies to the PDU session request.

In block 935, enforcement device 502 may determine whether client 202 is permitted to establish the requested PDU session with external device 117 (e.g., application server 601) based on the network access policies. When enforcement device 502 determines that client 202 is not permitted (block 935-NO), enforcement device 502 may reject the PDU session request (block 940). Enforcement device 502 may transmit a rejection message to client 202.

When enforcement device 502 determines that client 202 is permitted (block 935—YES), enforcement device 502 may forward the PDU session request to external device 117 (block 945). In block 950, enforcement device 502 may log user/application/session data that may be generated/communicated during the PDU session with external device 117.

FIG. 9 illustrates an exemplary process of the per-session validation with secure connection and authentication service, according to other exemplary embodiments, the per-session validation with secure connection and authentication service may perform additional operations, fewer operations, and/or different operations than those illustrated and described. According to some exemplary embodiments, any and all connections will be established via client 202 and enforcement device 502. In this way, in contrast to a zero touch approach, end device 130/user may not be afforded an "allow all" or unrestricted network access policy. Rather, for example, for each application request, session establishment request, and/or connection request, the request may be communicated via client 202 to enforcement device 502 and subject to the per-session validation with secure connection and authentication service.

As previously described, when a core network may not support key management or a need of higher level security, key management distribution mechanisms other than, for example, AKMA may be implemented. For example, asymmetric keys may be used between client 202 and enforcement orchestration device 304. For example, both private and public keys may be configured on client 202 prior to the OTA install. The public key may be shared with enforcement device 502 by client 202. According to another exemplary implementation, only a private key may be configured on client 202. Enforcement orchestration device 304 may manage the public key between client 202 and enforcement device 502. The private key may be periodically rotated, for example, using OTA communication. According to yet another exemplary implementation, a symmetric key approach may be used in which enforcement orchestration device 304 may securely distribute key information to client 202 and enforcement device 502. Client 202 may be authenticated by either A-KID or a hashed identifier may be pre-loaded in client 202.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks have been described regarding the processes illustrated in FIGS. 8 and 9, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 710, etc.), or a combination of hardware and software (e.g., software 720).

Embodiments have been described without reference to the specific software code because the software code can be designed to implement the embodiments based on the description herein and commercially available software design environments and/or languages. For example, diverse types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 710) of a device. A non-transitory storage medium includes one or more of the storage mediums described in relation to memory/storage 715. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
    establishing, by a network device of a radio access network with a client of an end device via the radio access network, an encrypted session and tunnel, wherein in response to the end device successfully completing a primary authentication and registration procedure with a core network associated with and via the radio access network, a request to establish the encrypted session and tunnel is received by the network device from the client;
    storing, by the network device, network access policies pertaining to at least one of the end device or a user of the end device;
    receiving, by the network device from the client, a packet data unit (PDU) session request to establish a PDU session with an application service device, wherein the PDU session request is a first one subsequent to the establishing; and
    determining, by the network device, whether the client is permitted to establish the PDU session based on the network access policies.

2. The method of claim 1, further comprising:
    requesting, by the network device, user credentials for a user; and
    determining, by the network device, that the user of the client has been successfully validated based on the user credentials.

3. The method of claim 1, further comprising:
    receiving, by the network device from an orchestrator device prior to the establishing, an encryption key for the orchestrator device issued by the core network, and a device identifier of the end device.

4. The method of claim 3, further comprising:
    receiving, by the network device from the client prior to the establishing, the request that includes the device identifier of the end device associated with the primary authentication and registration procedure;
    associating, by the network device, the encryption key to the device identifier received from the client; and
    authenticating, by the network device, the client based on the device identifier.

5. The method of claim 1, further comprising:
    determining, by the network device, that the client is permitted to establish the PDU session; and
    forwarding, by the network device to the application service device, the PDU session request.

6. The method of claim 1, wherein the network device receives all PDU session requests from the client via the encrypted session and tunnel.

7. The method of claim 1, wherein the establishing of the encrypted session and tunnel is based on an authentication and key management for applications (AKMA) Key identifier (A-KID) associated with the primary authentication and registration procedure.

8. The method of claim 1, wherein the PDU session request is received via the encrypted session and tunnel.

9. A network device comprising:
    a processor that is configured to:
        establish with a client of an end device via a radio access network, an encrypted session and tunnel, wherein in response to the end device successfully completing a primary authentication and registration procedure with a core network associated with and via the radio access network, a request to establish the encrypted session and tunnel is received by the network device from the client;
        store network access policies pertaining to at least one of the end device or a user of the end device;
        receive from the client, a packet data unit (PDU) session request to establish a PDU session with an application service device, wherein the PDU session request is a first one subsequent to the establishment of the encrypted session and tunnel; and
        determine whether the client is permitted to establish the PDU session based on the network access policies.

10. The network device of claim 9, wherein the processor is further configured to:
    request user credentials from a user of the client; and
    determine that the user of the client has been successfully authenticated based on the user credentials.

11. The network device of claim 9, wherein the processor is further configured to:
    receive from an orchestrator device prior to establishing, an encryption key for the orchestrator device issued by the core network, and a device identifier of the end device.

12. The network device of claim 11, wherein the processor is further configured to:
    receive from the client prior to the establishing, the request that includes the device identifier of the end device associated with the primary authentication and registration procedure;
    associate the encryption key to the device identifier received from the client; and
    authenticate the client based on the device identifier.

13. The network device of claim 9, wherein the processor is further configured to:
    determine that the client is permitted to establish the PDU session; and
    forward to the application service device, the PDU session request.

14. The network device of claim 9, wherein the processor is further configured to:
    receive all PDU session requests from the client via the encrypted session and tunnel.

15. The network device of claim 9, wherein the establishing of the encrypted session and tunnel is based on an authentication and key management for applications (AKMA) Key identifier (A-KID) associated with the primary authentication and registration procedure.

16. The network device of claim 9, wherein the PDU session request is received via the encrypted session and tunnel.

17. A non-transitory computer-readable storage medium storing instructions executable by a processor of a network device of a radio access network, wherein the instructions are configured to:
    establish with a client of an end device via the radio access network, an encrypted session and tunnel, wherein in response to the end device successfully completing a primary authentication and registration procedure with a core network associated with and via the radio access network, a request to establish the encrypted session and tunnel is received by the network device from the client;
    store network access policies pertaining to at least one of the end device or a user of the end device;
    receive from the client, a packet data unit (PDU) session request to establish a PDU session with an application service device, wherein the PDU session request is a first one subsequent to the establishment of the encrypted session and tunnel; and determine whether the client is permitted to establish the PDU session based on the network access policies.

18. The non-transitory computer-readable storage medium of claim 17, wherein the instructions are further configured to:
   request user credentials from a user of the client; and
   determine that the user of the client has been successfully authenticated based on the user credentials.

19. The non-transitory computer-readable storage medium of claim 17, wherein the establishing of the encrypted session and tunnel is based on an authentication and key management for applications (AKMA) Key identifier (A-KID) associated with the primary authentication and registration procedure.

20. The non-transitory computer-readable storage medium of claim 17, wherein the PDU session request is received via the encrypted session and tunnel.

* * * * *